No. 782,984. PATENTED FEB. 21, 1905.
J. A. McKINNON & S. T. NEELY.
NUT LOCK.
APPLICATION FILED JULY 23, 1903.
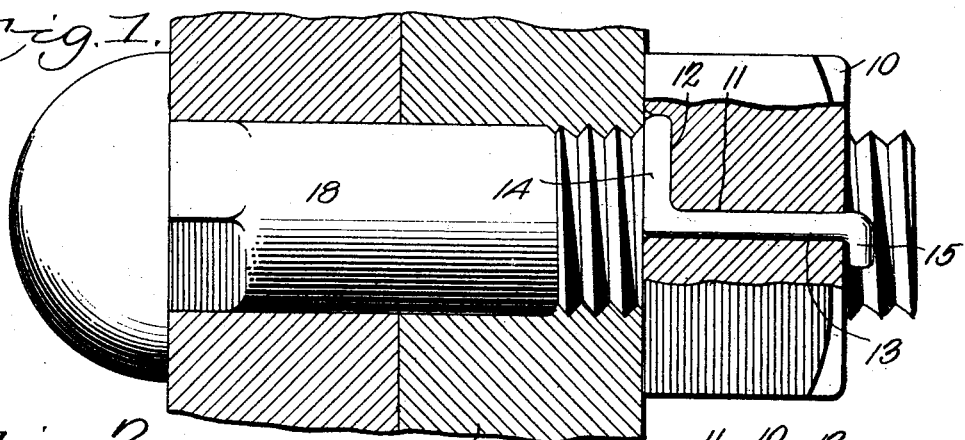
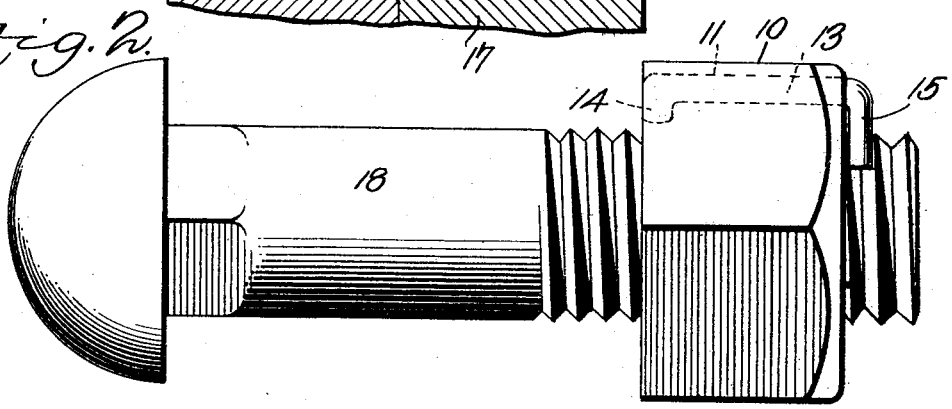
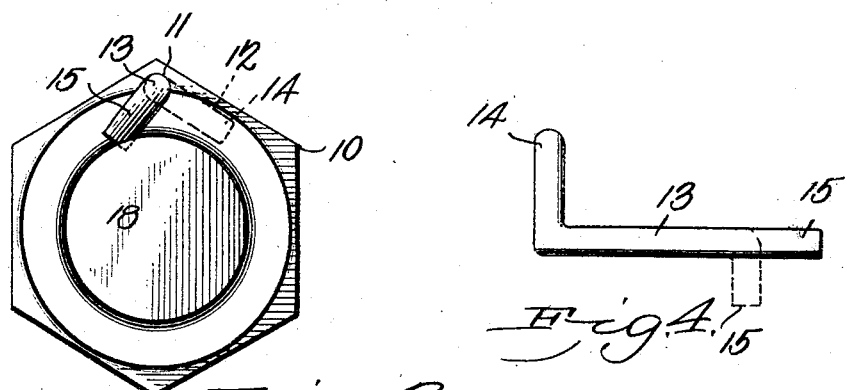

No. 782,984.                                         Patented February 21, 1905.

UNITED STATES PATENT OFFICE.

JOHN A. McKINNON AND SAMUEL T. NEELY, OF ELCAJON, CALIFORNIA.

NUT-LOCK.

SPECIFICATION forming part of Letters Patent No. 782,984, dated February 21, 1905.

Application filed July 23, 1903. Serial No. 166,754.

*To all whom it may concern:*

Be it known that we, JOHN A. MCKINNON and SAMUEL T. NEELY, citizens of the United States, residing at Elcajon, in the county of San Diego and State of California, have invented a new and useful Nut-Lock, of which the following is a specification.

This invention relates to nuts provided with means for preventing backward movement upon the bolt, and has for its object to simplify and improve devices of this character and produce a device simple in construction, efficient in action, and which may be cheaply constructed and easily applied and operated; and the invention consists in certain novel features of construction, as hereinafter shown and described, and specified in the claim.

In the drawings illustrative of the invention, in which corresponding parts are denoted by like designating characters, Figure 1 is a side elevation, partially in section, of the improved device applied. Fig. 2 is a view similar to Fig. 1 viewed from the other side. Fig. 3 is an end view of the parts shown in Fig. 2. Fig. 4 is a side view of the locking-pin detached.

The improved device may be applied to any of the various forms of nuts manufactured, but for the purpose of illustration is shown applied to an ordinary hexagonal nut 10. The nut is provided with a longitudinal aperture 11, preferably in one of its corners, so that it will not weaken the nut, and in the inner face of the nut a lateral recess 12 is formed, intersecting with or leading from the aperture 11 and forming a lateral extension thereof, as shown. Fitting in the aperture 11 is a lock-wire 13, preferably of steel or other suitable resilient material, with one end, 14, bent at right angles and fitting the recess 12 and the other end, 15, also bent at right angles and adapted to extend over the threaded aperture of the nut at the opposite side when the nut is not in position upon the bolt 18. The end 15 will be cut square across at the end or "chisel-pointed," as shown, so that when the nut thus equipped is threaded over the bolt the end 15 will be forced to one side and engage the threads at an angle thereto, as shown in Fig. 3, which will cause the sharp corner of the square-cut or chisel-shaped end to "nip" into the threads and at the same time pressing toward the center of bolt and effectually prevent any backward movement, while not preventing forward movement to any required extent. The end 15 thus becomes a spring-pawl, making its own ratchet as the nut is operated. To remove the nut, a small screw-driver or other similar implement may be forcibly inserted between the pawl 15 and the bolt 18, which will permit the nut to be turned backward and removed. The pawl member 15 is thus yieldably held in active position by the torsional force of the member 13.

It will be noted that the body 17, held by the nut, serves as a stop to prevent displacement or loosening of the lock-wire after the nut is set "home" by the wrench. In applying the device the lock-wire is preferably first formed with one of the ends, as 15, bent into position and the other end bent into the recess 12 after the insertion of the wire into the nut; but this order may be reversed and the end 15 bent into position after the insertion of the wire. The "gage" of the member 13 will be sufficient to produce the requisite resiliency and may be increased or decreased in size, as required.

The device may be applied to any size or form of nut and to nuts employed for any purpose and in any locality where such devices are required.

Having thus described our invention, what we claim is—

The combination with a bolt having plain threads, of a nut to engage the threads and having an aperture disposed parallel with the bolt-opening and provided on its inner face with a recess, of a locking member disposed within the orifice and having its inner end provided with a toe to engage the recess, and its outer end with a toe to engage between the threads of the bolt, the latter toe being disposed at an angle tangential to the axis of the bolt, whereby its free end will be self-seating, and will bite into the threads of the bolt upon retrograde movement being imparted thereto.

In testimony that we claim the foregoing as our own we have hereto affixed our signatures in the presence of two witnesses.

JOHN A. McKINNON.
SAMUEL T. NEELY.

Witnesses:
 W<small>M</small>. S<small>TELL</small>,
 S. J. A<small>GNEW</small>.